3,420,824
5-OXO-1,4,2-DIOXAZINES AND PREPARATION FROM α-AMIDOOXY ACIDS
Linus M. Ellis, Wilmington, Del., assignor to E. I. du Pont de Nemours and Company, Wilmington, Del., a corporation of Delaware
No Drawing. Filed July 26, 1966, Ser. No. 567,818
U.S. Cl. 260—244                                          8 Claims
Int. Cl. C07d 87/00; A01n 9/20

ABSTRACT OF THE DISCLOSURE 5-oxo-1,4,2-dioxazines, which are prepared by dehydrating 2-amidooxycarboxylic acids in the presence of anhydrides or halides of organic acids, acid halides of sulfur, phosphorus or silicon, or ketene, are useful as plant growth retardants.

---

This invention relates to, and has as its principal objects provision of, new heterocyclic compounds which contain nuclear nitrogen bonded directly to nuclear oxygen and the preparation of the same. These compounds are anhydro-α-amidooxy acids resulting from the removal of water from α-amidooxy carboxylic acids. Certain open-chain derivatives of the heterocyclic acids also form part of the invention.

The principal compounds of the invention can be assigned the formula

I.  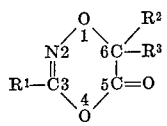

where:

R¹ and R³, alike or different, are hydrogen, aliphatic hydrocarbon of up to 18 carbons in which any unsaturation is ethylenic and such aliphatic hydrocarbon substituted with up to 2 halogens of atomic number 9–35, aromatic hydrocarbon of up to 10 carbons and such aromatic hydrocarbon substituted with up to 2 halogens of atomic number 9–35 or with up to 2 lower alkoxy radicals, or nitrogen heterocycles of 1 nitrogen and up to 6 carbons; and R² is hydrogen, 1–4 carbon alkyl, or aromatic hydrocarbon of up to 7 carbons.

These compounds are obtained by a liquid phase dehydration of α(or 2)-amidooxy acids for which may be written the general equation:

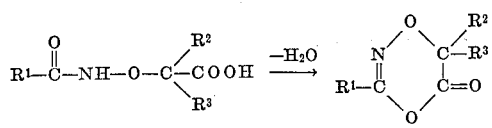

The dehydration is accomplished by reaction with an organic acid anhydride or halide, e.g., those of organic acids having up to 7 carbons, inorganic acid halides such as those of sulfur, phosphorus, and silicon, or ketene, in the liquid phase at a temperature in the range of 0–100° C.

The dehydrating reaction probably proceeds through intermediate formation of a mixed anhydride or acid halide followed by elimination of acid or hydrogen halide. As illustrated by the use of acetic anhydride (see Example 1) the reaction can be postulated as proceeding first via the formation of a mixed anhydride followed by ring closure with elimination of acetic acid.

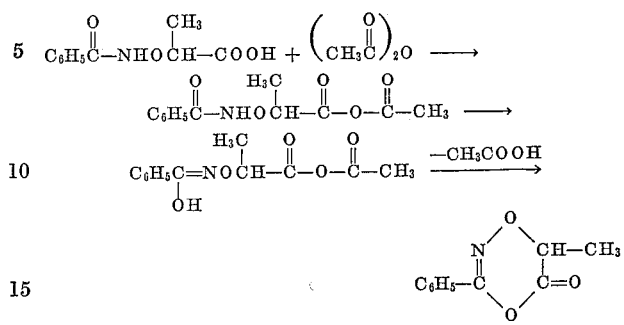

When thionyl chloride is used (see Example 2), the reaction probably proceeds with intermediate formation of the acid chloride.

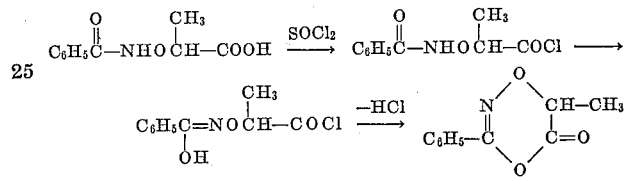

On the basis of the above reaction schemes, the reagents considered useful in making anhydro-amidooxy acids from the amidooxy acids are those that can cause intermediate formation of anhydrides or of acid halides. Thionyl chloride is the reagent of choice because of the readiness with which by-products (hydrogen chloride and sulfur dioxide) and any excess reagent are removed. Other reagents that can be used include (1) other acid anhydrides, for example, propionic anhydride, butyric anhydride, benzoic anhydride, chloracetic anhydride, and trifluoroacetic anhydride; (2) acid halides of organic acids, for example, acetyl chloride, butyryl chloride, benzoyl chloride, methyl chloroformate, chloroacetyl chloride, acetyl bromide and oxalyl chloride; (3) ketenes, particularly ketene itself; and (4) inorganic acid halides such as phosphorus penta- or trichloride, phosphorus oxychloride, phosphorus tribromide, and silicon tetrachloride.

Solvents and/or acid acceptors may be present during the reaction. In the case when phosphorus halides are employed, it is generally desired to have pyridine present, and when thionyl chloride is used, the presence of dimethyl formamide facilitates the reaction.

Useful solvents or inert diluents that may be present include tetrahydrofuran, pyridine, dialkyl amides such as dimethyl formamide, etc. The reaction is effected under anhydrous conditions since the dehydrating agents react rapidly with water.

The reagent is employed preferably in an amount at least equivalent on a molar basis to the acid being dehydrated. Excess amounts are generally present since many of the reagents can function as solvents and also be recovered or removed upon completion of the reaction.

It should be noted that a four-membered heterocyclic ring could be theoretically formed by the dehydration of this invention, i.e.,

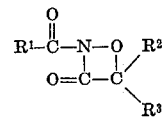

As pointed out in Example 1, below, it is considered that the six-membered ring is much more likely to be produced, and the compounds are named accordingly. The compounds, moreover, shows a single carbonyl band in the infrared spectrum at about 1800–1825 cm.$^{-1}$.

In any event, the anhydroamidooxy acid heterocyclic product formed is generally a solid or high-boiling liquid with limited stability to water. It should be protected against moisture if storage for any considerable time is intended. The solid products can be purified by recrystallization from inert organic solvents.

The dioxazine-5-(6H)-ones of this invention have useful plant growth-regulant properties as noted below. They are also useful for the preparation of the corresponding amides and esters by direct reaction with the appropriate amines or alcohols. Although some esters are old in the art, both they and the amides, which are new compounds, also have plant growth-regulant properties.

The general formula for the novel amides, which form one aspect of the invention, may be written as:

II.
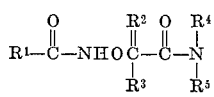

where $R^1$, $R^2$, and $R^3$ are as previously defined and $R^4$ and $R^5$, alike or different, are hydrogen, alkyl, aryl, lower alkoxy-alkyl, alkoxyaryl, carbalkoxyaryl, carbalkoxyalkyl, cyanoalkyl, cycloalkyl, and nitrogen heterocycles with up to 2 nitrogens and 5–6 ring members, and wherein $R^4$ and $R^5$ together have up to generally about 12 carbons. Preferred amides are those of Formula II wherein $R^1$ is aromatic, $R^2$ is hydrogen, $R^3$ is hydrogen or lower alkyl, $R^4$ is hydrogen or lower alkyl and $R^5$ is hydrocarbon.

The preparation of the amides can be illustrated by the following equation:

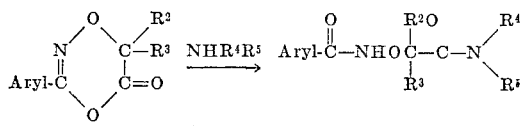

where the R's are as previously defined. The general preparation can be carried out as follows: An amine is added to a solution containing an equivalent molar amount of a 3-aryl-1,4,2-dioxazine-5-(6H)-one in anhydrous ether or tetrahydrofuran present in an amount of 10–25 times that of the dioxazine on a weight basis. The solution is stirred at reflux for about 30 minutes. Evaporation of solvent leaves a residue which can usually be recrystallized from commercial hexane to give N-substituted 2-(arylamidooxy)alkanoamide.

The following examples in which the parts given are by weight further illustrate the preparation and properties of the new compounds of this invention. Examples 1–5 disclose compounds of Formula I, above, and Examples 6–23, Formula II.

Example 1.—6-methyl-3-phenyl-1,4,2-dioxazine-5-(6H)-one

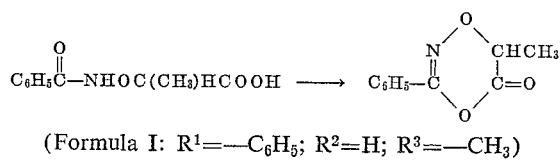

(Formula I: $R^1$=—$C_6H_5$; $R^2$=H; $R^3$=—$CH_3$)

A. A preparation of 2-(benzamidooxy)propionic acid, was carried out as follows:

A mixture of 274 parts of benzohydroxamic acid, 950 parts of absolute alcohol and a solution of 160 parts of sodium hydroxide in 800 parts of distilled water was placed in a reaction vessel equipped with a stirrer and packed in a bath containing about 15,000 parts of ice-water mixture. When the mixture was thoroughly chilled, 306 parts of α-bromopropionic acid were added and the mixture was stirred in the bath for 16 hours. The bath was removed, and the mixture was stirred at reflux for 0.5 hour. Alcohol was removed by distillation under water pump vacuum, and the residue was diluted with 300 parts of distilled water. Concentrated hydrochloric acid (180 parts) was added and the acidified solution was extracted with two portions of ethyl acetate totalling about 1350 parts. The extract was dried by filtration first through a bed of sodium chloride and then through a bed of anhydrous magnesium sulfate.

The dried filtrates from two preparations made as described above were combined, and most of the solvent was evaporated on a steam bath. Solid that separated on cooling was collected on a filter, dried, and recrystallized from ethyl acetate. The weight of 2-(benzamidooxy)propionic acid obtained was 544 parts (65% of theory), M.P. 129.5–130.5° C.

B. Ten parts of 2-(benzamidooxy)propionic acid was dissolved in 88 parts of tetrahydrofuran. Twenty parts of acetic anhydride and about one-tenth part of concentrated hydrochloric acid were added, and the resulting solution was allowed to stand 96 hours in a stoppered flask. The solution was then poured into several volumes of water. An oily layer separated, and solidified on standing. This solid was collected on a filter, washed with water, dried, and recrystallized from petroleum ether. Four parts of solid with a melting point of 65.5–66.5° C. was obtained. Analytical data corresponded to a compound resulting from abstraction of a molecule of water from a molecule of 2-(benzamidooxy)propionic acid.

*Analysis.*—Calcd. for $C_{10}H_9NO_3$: C, 62.77; H, 4.75; N, 7.33. Found: C, 62.78, 62.83; H, 5.16, 5.17; N, 7.27.

C. Another preparation carried out by the above procedure using 20 parts of 2-(benzamidooxy)propionic acid and proportionate quantities of other materials gave as product 13 parts of 6-methyl 3-phenyl-1,4,2-dioxazine-5-(6H)-one, (alternatively, 6-methyl-3-phenyl-5,6-dihydro-1,4,2-dioxazin-5-one), M.P. 66–67° C. A small portion of this material thoroughly mixed with an equal quantity of the previous product also gave a melting point of 66–67° C. Infrared spectra of the two products were substantially indentical. The molecular weight of the latter product determined by the boiling point method in benzene solution was 220 (theory is 191). These data show that the two products were the same, and were not compounds with an empirical formula represented by some multiple of $C_{10}H_9NO_3$.

The abstraction of water from 2-(benzamidooxy)propionic acid could lead to the following structures:

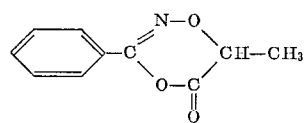

III.

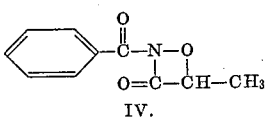

IV.

The new compounds of this invention have been assigned the dioxazine structure (I) because of the greater ease of formation of the 6-membered ring, and in view of the spectral properties. The infrared spectrum has a strong carbonyl band at 1800 cm.$^{-1}$, with weaker bands at 1575 cm.$^{-1}$ and 1610 cm.$^{-1}$ attributed to aromatic —C=C— and/or —C=N—. On the basis of literature reports, exocyclic carbonyl as in structure IV would have absorption at about 1650 cm.$^{-1}$.

Example 2

A mixture of 110 parts of 2-(benzamidooxy)propionic acid and 165 parts of thionyl chloride was stirred 2½ hours at reflux. Hydrogen chloride ceased to evolve. Excess thionyl chloride was distilled from the reaction mixture by heating on a steam bath under water pump vacuum. A test portion of the residue was recrystallized from petroleum ether. This melted at 66–67° C. and gave an infrared spectrum identical with that of the material from Example 1, showing identity with that material.

The balance of the crude product was recrystallized from commercial hexane to yield 86 parts (86% of theory) of 6-methyl-3-phenyl-1,4,2-dioxazine-5-(6H)-one with a melting point, after drying in vacuum to remove solvent, of 66–67° C.

Example 3

The method described in Example 2 was used to prepare 6-methyl-3-phenyl-1,4,2-dioxazine-5-(6H)-one from 100 parts of 2-(benzamidooxy)propionic acid and 150 parts of thionyl chloride. The product weighed 66 parts and melted at 66.3–67.3° C. The mass spectrum of this compound showed a parent ion corresponding to a molecular weight of 191.

Example 4.—3-phenyl-1,4,2-dioxazine-5-(6H)-one

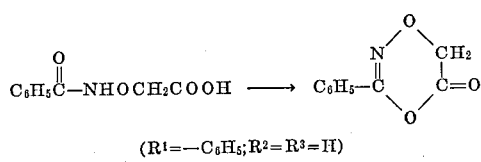

($R^1$=—$C_6H_5$; $R^2$=$R^3$=H)

A. 2-(benzamidooxy)acetic acid was prepared as follows:

A solution of 160 parts of sodium hydroxide in 800 parts of distilled water was added with stirring to a mixture of 274 parts of benzohydroxamic acid in 950 parts of absolute alcohol. The mixture was thoroughly chilled in an ice bath. Two hundred and seventy eight parts of bromoacetic acid was added, and the reaction mixture was stirred 16 hours in an ice bath. The reaction mixture was then heated at reflux for 0.5 hours, after which alcohol was removed under water pump vacuum, with heating on a steam bath. The residue was made acid by addition of 245 parts of conc. hyrochloric acid and extracted with 1600 parts of ethyl acetate in two portions. The extract was dried by filtration, first through a bed of sodium chloride and then through a bed of anhydrous magnesium sulfate. Most of the solvent was evaporated on a steam bath to leave a residue that formed a mushy solid on cooling. This was filtered to remove liquid, and solid was recrystallized from ethyl acetate. The 2-(benzamidooxy)acetic acid thus obtained (233 parts) melted at 142–143° C. McHale et al., J. Chem. Soc. 1964, 225, give 144–145° C. as the melting point of 2-(benzamidooxy)acetic acid made by a closely analogous procedure.

B. A mixture of 50 parts of 2-(benzamidooxy)acetic acid and 125 parts of thionyl chloride was stirred under a very gentle reflux. After 0.75 hour the evolution of hydrogen chloride appeared to diminish strongly, and after a brief period to resume strongly. At the same time the solution became red in color. Heating at reflux was discontinued at this point, and readily volatile material was removed by gentle heating under water pump vacuum. The residue was vacuum distilled to obtain a major portion with a tan to amber color and a boiling point of 107° C. at 0.9 mm. to 110° C. at 1.0 mm. The material solidified on standing, M.P. 25.5–27° C.

Analysis.—Calcd. for $C_9H_7NO_3$: C, 61.02; H, 3.98; N, 7.91. Found: C, 61.27; H, 4.14; N, 7.91.

This compound, 3-phenyl-1,4,2-dioxazine-5-(6H)-one or 3-phenyl-5,6-dihydro-1,4,2-dioxazin-5-one, resembled the 6-methyl derivative in having a single carbonyl band at about 1820 cm.$^{-1}$, with moderate to strong bands at 1490, 1560 and 1600 cm.$^{-1}$, attributed to monosubstituted phenyl groups and to the —C=N— group. The mass spectrum of the compound showed a parent ion corresponding to a molecular weight of 178.

Example 5.—6-ethyl-3-phenyl-1,4,2-dioxazine-5-(6H)-one

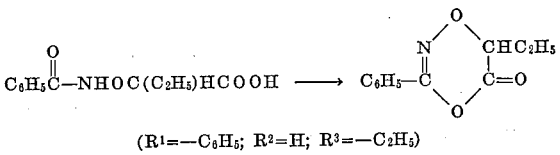

($R^1$=—$C_6H_5$; $R^2$=H; $R^3$=—$C_2H_5$)

A. 2-(benzamidooxy)butyric acid was prepared as follows:

A mixture of 475 parts of absolute alcohol, 137 parts of benzohydroxamic acid, 167 parts of 2-bromobutyric acid and a solution of 80 parts of sodium hydroxide in 400 parts of distilled water was stirred 5.5 hours at reflux. The reaction product was worked up for recovery of the 2-(benzamidooxy)butyric acid by the method described under Example 4 for preparation of 2-(benzamidooxy)acetic acid using half the quantities of hydrochloric acid and ethyl acetate described there. By recrystallization of the crude product from ethyl acetate there was obtained 127.5 parts of 2-(benzamidooxy)butyric acid with a melting point of 132.5–133.5° C.

B. A mixture of 32 parts of 2-(benzamidooxy)butyric acid and 92 parts of thionyl chloride was stirred at reflux for 30 minutes, when evolution of hydrogen chloride had largely ceased. Excess thionyl chloride was removed by heating on a steam bath under aspirator vacuum. The residue was distilled from a small Claisen flask to yield mainly 23 parts of 6-ethyl-3-phenyl-1,4,2-dioxazine-5-(6H)-one, (alternatively, 6-ethyl-3-phenyl-5,6-dihydro-1,4,2-dioxazin-5-one), with a boiling point of 95–99° C. at 0.05 mm.

Analysis.—Calcd. for $C_{11}H_{11}NO_3$: C, 64.38; H, 5.40; N, 6.83. Found: C, 64.58; H, 5.41; N, 7.06.

The infrared spectrum of this compound showed the same strong carboxyl absorption at about 1825 cm.$^{-1}$ as the other dioxazine derivatives.

Table I, which follows, illustrates additional compounds of the general Formula I that are obtainable by the procedures given in the above examples:

TABLE I
[Formula I]

| Compound | R¹ | R² | R³ | Acid used in dehydration |
|---|---|---|---|---|
| 1. 6-methyl-3-undecyl-1,4,2-dioxazine-5-(6H)-one. | Undecyl | Hydrogen | Methyl | 2-(lauramidooxy)propionic acid. |
| 2. 3-(2-methylpropyl)-6-phenyl-1,4,2-dioxazine-5-(6H)-one. | 2-methylpropyl | do | Phenyl | 2-(isovaleramidooxy)phenylacetic acid. |
| 3. 6,6-dimethyl-3-phenyl-1,4,2-dioxazine-5-one. | Phenyl | Methyl | Methyl | 2-(benzamidooxy)isobutyric acid. |
| 4. 3-phenyl-6-decyl-1,4,2-dioxazine-5-(6H)-one. | do | Hydrogen | Decyl | 2-(benzamidooxy)lauric acid. |
| 5. 3-methyl-6-phenyl-1,4,2-dioxazine-5-(6H)-one. | Methyl | do | Phenyl | 2-(acetamidooxy)phenylacetic acid. |
| 6. 6-(p-chlorophenyl)-3-phenyl-1,4,2-dioxazine-5-(6H)-one. | Phenyl | do | p-Chlorophenyl | 2-(benzamidooxy)-p-chlorophenylacetic acid. |
| 7. 6-(1-methylpropyl)-3-(p-chlorophenyl)-1,4,2 dioxazine-5-(6H)-one. | p-Chlorophenyl | do | 1-methylpropyl | 2-(p-chlorobenzamidooxy)-3-methylvaleric acid. |
| 8. 6-methyl-3-(3-pyridyl)-1,4,2-dioxazine-5-(6H)-one. | 3-pyridyl | do | Methyl | 2-(nicotinamidooxy)propionic acid. |
| 9. 6-methyl-3-cyclopentyl-1,4,2-dioxazine-5-(6H)-one. | Cyclopentyl | do | do | 2-(cyclopentanecarbonamidooxy)proponic acid. |
| 10. 6-cyclohexyl-3-phenyl-1,4,2-dioxazine-5-(6H)-one. | Phenyl | do | Cyclohexyl | 2-(benzamidooxy)cyclohexylacetic acid. |
| 11. 3-benzyl-6-methyl-1,4,2-dioxazine-5-(6H)-one. | Benzyl | do | Methyl | 2-(phenylacetamidooxy)propionic acid. |
| 12. 3-hexyl-6-methyl-1,4,2-dioxazine-5-(6H)-one. | Hexyl | do | do | 2-(enanthamidooxy)propionic acid. |
| 13. 3-(4-methoxyphenyl)-6-(α-naphthyl)-1,4,2-dioxazine-5-(6H)-one. | 4-methoxyphenyl | do | α-Naphthyl | 2-(p-anisamidooxy)-α-naphthylacetic acid. |
| 14. 3-(m-tolyl)-6-(3-phenylpropyl)-1-4,2-dioxazine-5-(6H)-one. | m-Tolyl | do | 3-phenylpropyl | 2-(m-toluamidooxy)-5-phenylvaleric acid. |
| 15. 6-methyl-1,4,2-dioxazine-5-(6H)-one. | Hydrogen | do | Methyl | 2-(formamidooxy)propionic acid. |
| 16. 3-phenyl-6-(3-pyridyl)-1,4,2-dioxazine-5-(6H)-one. | Phenyl | do | 3-pyridyl | 2-(benzamidooxy)-3-pyridyl-acetic acid. |
| 17. 3-vinyl-6-methy-1,4,2-dioxazine-5-(6H)-one. | Vinyl | do | Methyl | 2-(acrylamidooxy)propionic acid. |
| 18. 3,6,6-triphenyl-1,4,2-dioxazine-5-(6H)-one. | Phenyl | Phenyl | Phenyl | 2-(benzamidooxy)-2,2-diphenylacetic acid. |

Of the preceding compounds, those particularly preferred have at least one hydrogen on nuclear carbon (R³), and have hydrocarbon radicals on the maintaining R¹ and R² positions with a total of up to 12 carbons. Preferably, R¹ is aryl and R² is lower (1–4 carbon) alkyl.

Example 6.—N-dodecyl-2(benzamidooxy)propionamide

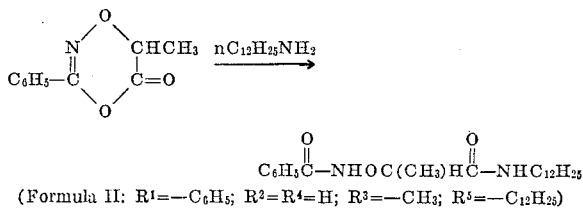

(Formula II: R¹=—C₆H₅; R²=R⁴=H; R³=—CH₃; R⁵=—C₁₂H₂₅)

Nine and six tenths parts of n-dodecylamine was added to a solution of 10 parts of 6-methyl-3-phenyl-1,4,2-dioxazine-5-(6H)-one in 284 parts of anhydrous ether. The solution was stirred at reflux for 30 minutes. Evaporation of ether left 19.5 parts of residue. This was recrystallized from commercial hexane to yield 17.5 parts of N-dodecyl-2-(benzamidooxy)propionamide. After drying overnight under vacuum to remove any residual solvent, this product melted at 71–72° C.

*Analysis.*—Calcd. for $C_{22}H_{36}N_2O_3$: C, 70.17; H, 9.10; N, 7.44. Found: C, 70.39; H, 9.52; N, 7.37.

Table II, which follows, shows products of Formula II obtained when the above method of Example 6 is used.

TABLE II
[Formula II]

| Example | Dioxazine derivative used [1] | Amine used | Product obtained | R⁴ | R⁵ | Percent yield [2] | Melting point, °C. |
|---|---|---|---|---|---|---|---|
| 7 | I | Dodecylamine | N-dodecyl(benazmidooxy)-acetamide | Hydrogen | Dodecyl | 83 | 73–74 |
| 8 | I | Methylamine | N-methyl(benzamidooxy)-acetamide | do | Methyl | 80 | 116.5–118 |
| 9 | I | Dimethylamine | N,N-dimethyl(benzamidooxy)acetamide. | Methyl | do | 80 | 122–123.5 |
| 10 | I | Isopropylamine | N-isopropyl(benzamidooxy)acetamide | Hydrogen | Isopropyl | 45 | 78–79 |
| 11 | II | Ammonia | 2-(benzamidooxy)-propionamide | do | Hydrogen | 36 | 154–155 |
| 12 | II | Aniline | 2-(benzamidooxy)-propionanilide | do | Phenyl | 55 | 152–153 |
| 13 | II | Dimethylamine | N,N-dimethyl-2-(benzamidooxy)propionamide. | Methyl | Methyl | 60 | 90–91 |
| 14 | II | Methylamine | N-methyl-2-(benzamidooxy)-propionamide. | Hydrogen | do | 30 | 115.5–116 |
| 15 | II | Diethylamine | N,N-diethyl-2-(benzamidooxy)propionamide. | Ethyl | Ethyl | 72 | 127–128 |
| 16 | II | Methyl 2-aminooxy-propionate. | Methyl 2-[2-benzamidooxy)-propionamidooxy]propionate. | Hydrogen | 1-(carbomethoxy)ethoxy | 24 | 164–165 |
| 17 | II | 2-aminopyrimidine. | N-(2-pyrimidinyl)-2-(benzamidooxy)-propionamide. | do | 2-pyrimidinyl | 38 | 169–170 |
| 18 | II | 2-amino-4-methyl-pyrimidine. | N-(4-methyl-2-pyrimidinyl)-2-(benzamidooxy)propionamide. | do | 2(4-methyl)-pyrimidinyl | 33 | 148.5–149.5 |
| 19 | II | 2-amino-4,6-dimethylpyrimidine. | N-(4,6-dimethyl-2-pyrimidinyl)-2-(benzamidooxy)propionamide. | do | 2(4,6-dimethyl)-pyrimidinyl. | 60 | 127–129 |
| 20 | II | Ethyl 4-aminobenzoate. | N-(4-carbethoxyphenyl)-2-(benzamidooxy)propionate. | do | 4-carboethoxyphenyl | 57 | 153.6–154 |
| 21 | II | N-ethyl-2-cyanoethylamine. | N-ethyl-N-(2-cyanoethyl)-2-(benzamidooxy)propionamide. | Ethyl | 2-cyanoethyl | | Liquid |
| 22 | II | Hexylamine | N-hexyl-2-(benzamidooxy)-propionamide. | Hydrogen | Hexyl | 94 | 116.7–117.5 |
| 23 | III | Ammonia | 2-(benzamidooxy)butyramide | do | Hydrogen | 58 | 170–171 |

[1] I is 3-phenyl-5,6-dihydro-1,4,2-dioxazin-5-one, i.e., R¹=—C₆H₅ and R²=R³=H. II is 6-methyl-3-phenyl-5,6-dihydro-1,4,2-dioxazin-5-one, i.e., R¹=—C₆H₅, R²=H and R³=—CH₃. III is 6-ethyl-3-phenyl-5,6-dihydro-1,4,2-dioxazin-5-one, i.e., R¹=—C₆H₅, R²=H and R³=—C₂H₅.
[2] Precent yield is based on dioxazine derivative used.

Alcoholysis of the 2-(N-arylamidooxy) acid amides in the presence of hydrogen chloride leads to the hydrochlorides of the aminooxy acid amides. For example, hydrogen chloride was passed into a solution of 18 g. of N-dodecyl-2-(benzamidooxy)propionamide in 100 ml. of methanol at a rate sufficient to heat the solution to reflux. The solution was maintained at reflux for 15 minutes by introduction of hydrogen chloride. The product was evaporated on a steam bath leaving a liquid residue that solidified on cooling. This residue was recrystallized from ethyl acetate to obtain 11 g. of the hydrochloride of N-dodecyl-2-(aminooxy)propionamide melting at 106.2–108.2° C.

*Analysis.*—Calcd. for $C_{15}H_{33}ClN_2O_2$: C, 58.32%; H, 10.77%; N, 9.07%. Found: C, 58.99%; H, 10.43%; N, 8.96%.

A similar procedure was used to prepare the hydrochloride of N-hexyl-2-(aminooxy)propionamide from N-hexyl-2-(benzamidooxy)propionamide. After recrystallization from ethyl acetate the product melted at 94–95° C.

*Analysis.*—Calcd. for $C_9H_{21}ClN_2O_2$: C, 48.09%; H, 9.42%; N, 12.46%. Found: C, 48.37, 48.23%; H, 9.46, 9.04%; N, 12.36, 12.46%.

The new amidooxyamides prepared as described in Example 6 and further illustrated in Table II are active for biological growth control. When the amides are derived from ammonia or lower amines (e.g., those up to about 8 carbons), the compounds when applied post-emergence at a rate of 2–5 lbs./acre retard the growth of grasses, particularly Johnson grass, and produce hormone response and axillary stimulation.

Derivatives of higher amines, e.g., 2-(benzamidooxy)-N-dodecylacetamide when used at a concentration of 10 γ/ml. control *Staphylococcus aureus*. Furthermore, derivatives of the latter compound obtained by alcoholysis, e.g., N-dodecyl-2-(aminooxy)propionamide hydrochloride, also control the growth of such bacteria as *Staphylococcus aureus*, *Streptococcus pyogenes* and *Bacillus subtilis* in liquid media at 10 γ/ml.

The preparation of esters of the anhydro acids of this invention can be illustrated as follows:

Example 24.—Allyl-2-(benazmidooxy)propionate

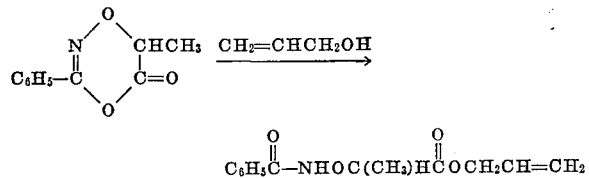

$$C_6H_5\overset{O}{\overset{\|}{C}}-NHOC(CH_3)H\overset{O}{\overset{\|}{C}}OCH_2CH=CH_2$$

Gaseous hydrogen chloride was passed for 10 seconds into a stirred solution of 15 parts of 6-methyl-3-phenyl-1,4,2-dioxazine-5(6H)-one in 64 parts of allyl alcohol. The solution was stirred at reflux for 1.5 hours after which excess allyl alcohol was removed by distillation under water pump vacuum. The residue was distilled from a small Claisen flask to obtain 11 parts of allyl 2-(benzamidooxy)propionate as a viscous liquid with a boiling point of 130–135° C. at 0.03–0.05 mm.

*Analysis.*—Calcd. for $C_{13}H_{15}NO_4$: C, 62.64; H, 6.07; N, 5.62. Found: C, 62.20; H, 6.08; N, 5.01, 4.98.

Substitution of other alcohols for allyl alcohol gives corresponding esters. Suitable alcohols are amyl, isopropyl, ethyl or methyl alcohols. Similarly the specific dioxazine used can be replaced by other dioxazines as described previously; see, for example, Table I.

Allyl 2-(benzamidooxy)propionate is an active postemergence herbicide at both 16 and 2 lb./acre. The effect at 2 lb./acre is principally one of growth retardation, hormone action and axillary stimulation; and, on tobacco, inhibits the growth of suckers. 6-methyl-3-phenyl-1,4,2-dioxazine-5-(6H)-one is a strong growth retardant on grasses when applied pre- or post-emergence by spraying a solution at a rate equivalent to 16 lb./acre. It is a fairly strong growth retardant at 2 lb./acre in post-emergence tests, and in test gave about 40% control of tobacco suckering, but with some burn.

Biologically active compositions of compounds of the present invention can be prepared by admixing at least one of the active compounds with pest-control adjuvants or modifiers to provide compositions in the form of dusts, water-dispersible powders, high-strength concentrates, and solutions or dispersions in inert organic liquids. They can be used with a carrier or diluent agent such as a finely divided solid, an organic liquid, a dispersing agent, an emulsifying agent, or any suitable combination of these. The new dioxazines react with compounds containing active hydrogen such as amino and hydroxyl-containing compounds and, upon contact with water, are hydrolyzed. However, at ordinary temperatures the rate is relatively slow. For use in plant growth control, it is preferred that they be formulated in nonaqueous systems, or used relatively soon after dilution or mixture with water.

The following specific formulations, in which percentages are by weight, are presented to illustrate the use of the new dioxazines of this invention:

EXAMPLE A

A formulation is made up from the following ingredients:

| | Percent |
|---|---|
| 3-phenyl-1,4,2-dioxazine-5-(6H)-one | 10 |
| Diatomaceous silica | 30 |
| Micaceous talc | 60 |

The above dust is prepared by blending and grinding the active material with the minor diluent, then blending the resulting powder with the major diluent.

Ten pounds of the dust formulation described above (1 pound of active ingredient) is dusted on the foliage of an acre of sugarcane or syrup-type sorghum. Application is made approximately six weeks before harvest. The treatment retards the growth of the plant and causes it to ripen. When harvested, sap from treated plants contains a higher percentage of sucrose than sap from untreated plants.

EXAMPLE B

A formulation is made up from the following ingredients:

| | Percent |
|---|---|
| 3-phenyl-1,4,2-dioxazine-5-(6H)-one | 15 |
| Sodium lauryl sulfate | 60 |
| Synthetic fine silica | 25 |

The above composition is prepared by blending, grinding, and reblending the components.

The above composition of 3-phenyl-1,4,2-dioxazine-5-(6H)-one is applied in the spring at the rate of 25 pounds of active ingredient to an acre infested with seedling Johnson grass and barnyardgrass. The treatment effectively controls these species.

EXAMPLE C

Another formulation is made up from:

| | Percent |
|---|---|
| 3-phenyl-1,4,2-dioxazine-5-(6H)-one | 90 |
| Dioctyl sodium sulfosuccinate | 2 |
| Synthetic fine silica | 8 |

The above composition is ground to pass a 50-mesh screen. It can be used directly or in further formulation.

EXAMPLE D

Another formulation is made up from:

| | Percent |
|---|---|
| 6-ethyl-3-phenyl-1,4,2-dioxazine-5-(6H)-one | 25 |
| Alkylphenol polyethylene oxide condensate | 13 |
| Xylene | 62 |

The above emulsifiable oil is prepared by mixing the components with agitation until a homogeneous solution results. The oil may be emulsified with water directly before use or extended with additional oil for application.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

[I] 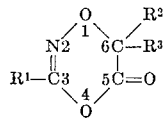

wherein $R^1$ and $R^3$, alike or different, are selected from the group consisting of hydrogen; aliphatic hydrocarbon of up to 18 carbons in which any unsaturation is ethylenic and such aliphatic hydrocarbon substituted with up to 2 halogens of atomic number 9–35; aromatic hydrocarbon of up to 10 carbons and such aromatic hydrocarbon substituted with up to 2 halogens of atomic number 9–35 or with up to 2 lower-alkoxy radicals; and 3-pyridyl; and $R^2$ is selected from the group consisting of hydrogen; 1–4 carbon alkyl; and aromatic hydrocarbon of up to 7 carbons;

said compound having a strong carbonyl absorption band in the infrared at about 1800–1825 cm.$^{-1}$.

2. The compound of claim 1 wherein $R^1=-C_6H_5$, $R^2=H$ and $R^3=-CH_3$, 6-methyl-3-phenyl-1,4,2-dioxazine-5-(6H)-one.

3. The compound of claim 1 wherein $R^1=-C_6H_5$, and $R^2=R^3=H$, 3-phenyl-1,4,2-dioxazine-5-(6H)-one.

4. The compound of claim 1 wherein $R^1=-C_6H_5$, $R^2=H$ and $R^3=-C_2H_5$, 6-ethyl-3-phenyl-1,4,2-dioxazine-5-(6H)-one.

5. The process of producing an anhydro acid of claim 1 which comprises:

dehydrating, in liquid phase and at a temperature in the range 0–100° C., a 2-amidooxy acid of the formula

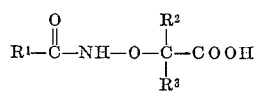

$R^1$, $R^2$ and $R^3$ being as defined in claim 1, by means of a member of the group consisting of: alkanoic acid anhydrides of up to 7 carbons; alkanoic acid chlorides of up to 7 carbons; trifluoroacetic anhydride; chloracetic anhydride; chloroacetyl chloride; oxalyl chloride; acid halides of sulfur, phosphorous and silicon; and ketene.

6. The process of preparing the compound of claim 2 which comprises dehydrating 2-(benzamidooxy)propionic acid in liquid phase and at a temperature in the range 0–100° C. by means of a member of the group consisting of acetic anhydride and thionyl chloride.

7. The process of preparing the compound of claim 3 which comprises dehydrating 2-(benzamidooxy)acetic acid in liquid phase and at a temperature in the range 0–100° C. by means of thionyl chloride.

8. The process of preparing the compound of claim 4 which comprises dehydrating 2-(benzamidooxy)butyric acid in liquid phase and at a temperature in the range 0–100° C. by means of thionyl chloride.

References Cited

FOREIGN PATENTS 1,432,738   2/1966   France.

OTHER REFERENCES

Patterson, The Ring Index, 2nd ed. page 25, Washington, D.C., Amer. Chem. Soc., 1960.

HENRY R. JILES, *Primary Examiner.*

N. TROUSOF, *Assistant Examiner.*

U.S. Cl. X.R.

424—248; 71—88; 260—239, 256.4, 295.5, 453, 465, 465.4, 471, 482, 544, 546